US012633084B2

(12) United States Patent
Jo et al.

(10) Patent No.: US 12,633,084 B2
(45) Date of Patent: May 19, 2026

(54) ELECTRONIC DEVICE FOR GENERATING DESCRIPTOR FOR FEATURE POINT, AND OPERATION METHOD THEREOF

(71) Applicant: Nextchip Co., Ltd., Seongnam-si (KR)

(72) Inventors: Sung Yong Jo, Seongnam-si (KR); Won Seob Na, Seoul (KR)

(73) Assignee: Nextchip Co., Ltd., Seongnam-si (KR)

( * ) Notice: Subject to any disclaimer, the term of this patent is extended or adjusted under 35 U.S.C. 154(b) by 247 days.

(21) Appl. No.: 18/562,586

(22) PCT Filed: Feb. 11, 2022

(86) PCT No.: PCT/KR2022/002090
§ 371 (c)(1),
(2) Date: Nov. 20, 2023

(87) PCT Pub. No.: WO2023/008671
PCT Pub. Date: Feb. 2, 2023

(65) Prior Publication Data
US 2024/0242474 A1 Jul. 18, 2024

(30) Foreign Application Priority Data
Jul. 28, 2021 (KR) ........................ 10-2021-0099187

(51) Int. Cl.
G06V 10/72 (2022.01)
G06V 10/75 (2022.01)
G06V 10/77 (2022.01)

(52) U.S. Cl.
CPC ............ G06V 10/72 (2022.01); G06V 10/751 (2022.01); G06V 10/7715 (2022.01)

(58) Field of Classification Search
CPC .. G06V 10/72; G06V 10/751; G06V 10/7715; G06V 10/46; G06V 10/462;
(Continued)

(56) References Cited

U.S. PATENT DOCUMENTS

| | | | | |
|---|---|---|---|---|
| 2011/0255781 A1* | 10/2011 | Hamsici | .............. | G06V 10/462 |
| | | | | 382/170 |
| 2017/0098135 A1* | 4/2017 | Munteanu | ............ | G06V 10/955 |

(Continued)

FOREIGN PATENT DOCUMENTS

| | | |
|---|---|---|
| KR | 10-2012-0102738 A | 9/2012 |
| KR | 10-2015-0031333 A | 3/2015 |

(Continued)

OTHER PUBLICATIONS

International Search Report dated May 12, 2022 for International Application No. PCT/KR2022/002090; 7 Pages.
(Continued)

*Primary Examiner* — Han Hoang
(74) *Attorney, Agent, or Firm* — DALY, CROWLEY, MOFFORD & DURKEE, LLP

(57) ABSTRACT

The present invention, according to one embodiment, in order to generate a descriptor for a feature point extracted from an input image, may: determine the size of each of a plurality of sub-patches included in a main patch having a preset size on the basis of the feature point in the input image; calculate gradient directions for each pixel constituting a target sub-patch from among the plurality of sub-patches; determine the number of bins for distinguishing the gradient directions; generate, with respect to the target sub-patch, a histogram for a plurality of bins on the basis of the gradient directions of the pixels constituting the target sub-patch; and generate a descriptor for the feature point on the basis of the histogram. Various other embodiments may also be possible.

9 Claims, 11 Drawing Sheets

(58) Field of Classification Search
CPC ..... G06V 10/50; G06V 10/507; B60W 40/02;
G06T 3/40; G06T 5/40; G06T 7/70;
G06T 11/60; G06T 2210/61
See application file for complete search history.

(56) References Cited

U.S. PATENT DOCUMENTS

2019/0095748 A1* 3/2019 Gan ........................ G06V 10/50
2022/0155458 A1* 5/2022 Jeong ...................... G01S 7/484

FOREIGN PATENT DOCUMENTS

| KR | 10-2018-0031989 A | 3/2018 |
| KR | 10-2018-0042254 A | 4/2018 |
| KR | 10-1853211 B1 | 4/2018 |
| KR | 2018-0045557 A | 5/2018 |

OTHER PUBLICATIONS

Korean Office Action (with Machine English Translation from Espacenet.com) dated Jan. 23, 2024 for Korean Application No. 10-2021-0099187; 11 Pages.
Response (with Machine English Translation from Espacenet.com) to Korean Office Action dated Jan. 23, 2024 for Korean Application No. 10-2021-0099187; Response filed Mar. 18, 2024; 10 Pages.

* cited by examiner

240
250
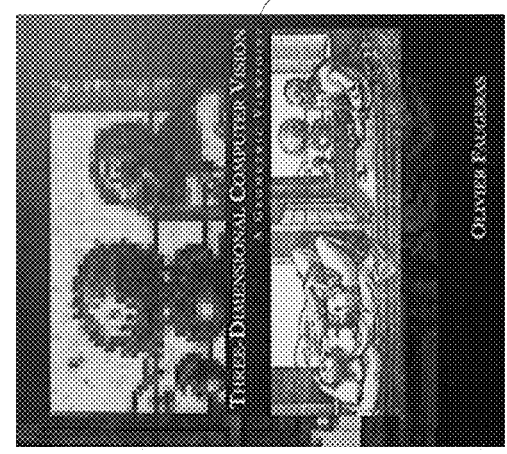
260
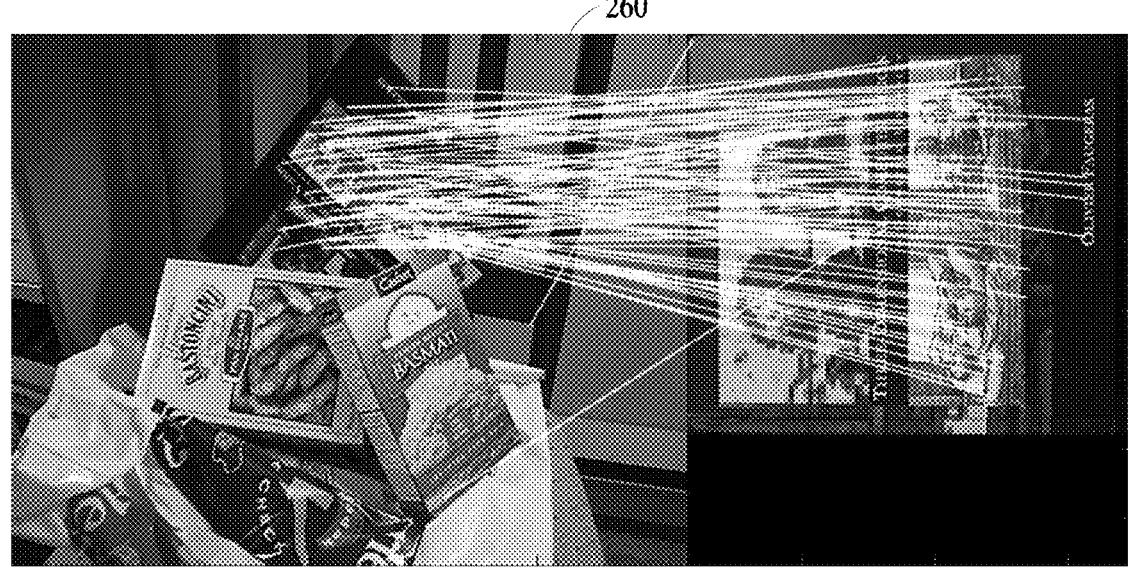
FIG. 2B

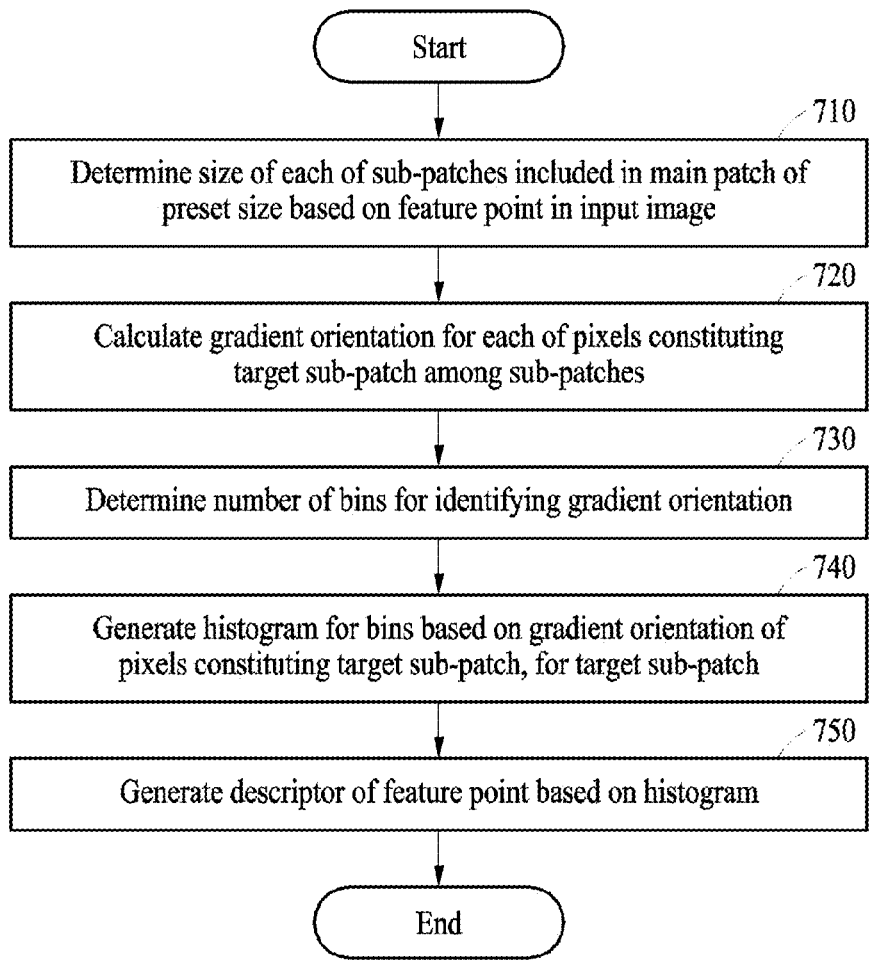

Start

710

Determine size of each of sub-patches included in main patch of preset size based on feature point in input image

720

Calculate gradient orientation for each of pixels constituting target sub-patch among sub-patches

730

Determine number of bins for identifying gradient orientation

740

Generate histogram for bins based on gradient orientation of pixels constituting target sub-patch, for target sub-patch

750

Generate descriptor of feature point based on histogram

End

FIG. 7

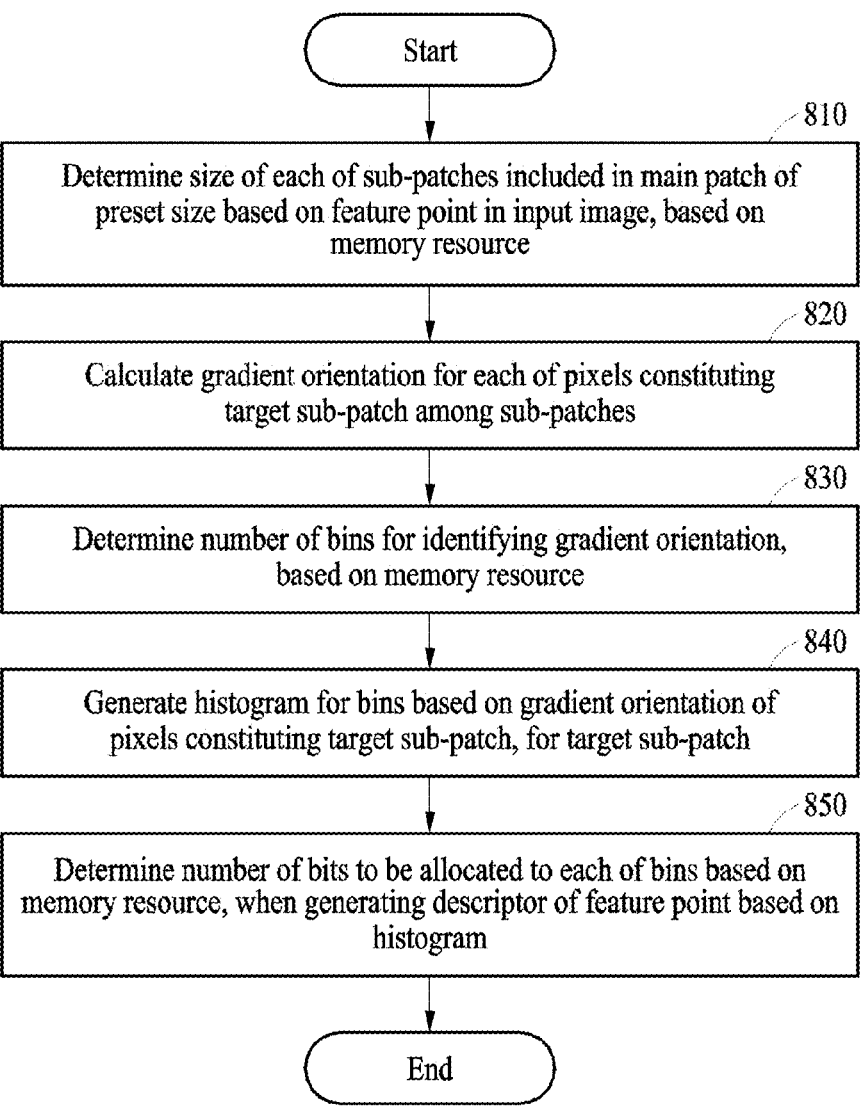

Start

810

Determine size of each of sub-patches included in main patch of preset size based on feature point in input image, based on memory resource

820

Calculate gradient orientation for each of pixels constituting target sub-patch among sub-patches

830

Determine number of bins for identifying gradient orientation, based on memory resource

840

Generate histogram for bins based on gradient orientation of pixels constituting target sub-patch, for target sub-patch

850

Determine number of bits to be allocated to each of bins based on memory resource, when generating descriptor of feature point based on histogram End

FIG. 8

From 760

ELECTRONIC DEVICE FOR GENERATING DESCRIPTOR FOR FEATURE POINT, AND OPERATION METHOD THEREOF

CROSS REFERENCE TO RELATED APPLICATION

This application is a U.S. national stage filing under 35 U.S.C § 371 of PCT Application No. PCT/KR2022/002090 filed on Feb. 11, 2022, and entitled "ELECTRONIC DEVICE FOR GENERATING DESCRIPTOR FOR FEATURE POINT, AND OPERATION METHOD THEREOF," which is based on and claims priority to Korean Patent Application No. 10-2021-0099187, filed on Jul. 28, 2021, which applications are each hereby incorporated herein by reference in their entireties.

TECHNICAL FIELD

The following embodiments relate to a method of generating a descriptor of a feature point extracted from an input image, and more particularly, to a descriptor generation method for effective memory management based on a modified scale-invariant feature transform (SIFT) algorithm.

BACKGROUND ART

Various computer vision (CV) technologies for determining matching between images for object detection, tracking, and the like are in development. For example, in the field of CV, technologies such as structure from motion (SfM), visual odometry (VO), and simultaneous localization and mapping (SLAM) may determine image matching based on feature points. They may determine image matching by extracting feature points from input images, generating descriptors representing information about the feature points, and comparing descriptors between multiple images.

In the field of CV, algorithms such as a scale-invariant feature transform (SIFT) algorithm and an oriented FAST (features from accelerated segment test) and rotated BRIEF (binary robust independent elementary features) (ORB) algorithm may be frequently used to extract feature points and generate descriptors. The ORB algorithm may be simpler than the SIFT algorithm because it represents feature points and descriptors only using a difference in brightness values between pixels. However, when an object changes according to various environmental conditions (e.g., lens distortion, angle, lighting, etc.), it may not robustly represent feature points compared to the SIFT algorithm. The SIFT algorithm may configure descriptors more elaborately than the ORB algorithm. However, it may require a great amount of computation or calculation, decreasing the speed, and may use more memory for storing descriptors than the ORB algorithm.

According to the related art, Korean Patent Publication No. 10-1853060 entitled "apparatus and method for determining features invariant under deformation" (applicant: Korea Institute of Science and Technology (KIST)) discloses a method of determining corresponding points that are invariant to image deformation.

DISCLOSURE OF INVENTION

Technical Goals

The computation speed of a scale-invariant feature transform (SIFT) algorithm may be improved by implementing parallel processing using hardware resources. For example, on a field-programmable gate array (FPGA) platform using a system on chip (SoC), the algorithm may extract feature points from images and generate descriptors in real time.

However, in the case of memory, the number of bits of a descriptor to be stored regardless of the platform may be used for determination, and thus, even on the FPGA platform, the SIFT algorithm may still need to use more than four times the memory, compared to an oriented FAST (features from accelerated segment test) and rotated BRIEF (binary robust independent elementary features) (ORB) algorithm.

According to an aspect, there is provided an electronic device and method for reducing memory usage of descriptors in the process of generating descriptors of feature points.

However, the technical aspects are not limited to the preceding aspect(s), and other technical aspects may also be present.

Technical Solutions

According to an embodiment, there is provided a descriptor generation method of generating a descriptor of a feature point extracted from an input image, the descriptor generation method including: determining the size of each of a plurality of sub-patches included in a main patch of a preset size based on the feature point in the input image; calculating a gradient orientation for each of pixels constituting a target sub-patch among the plurality of sub-patches; determining the number of a plurality of bins for dividing the gradient orientation; for the target sub-patch, generating a histogram for the plurality of bins based on the gradient orientation of the pixels constituting the target sub-patch; and generating the descriptor of the feature point based on the histogram.

According to an embodiment, the determining of the size of each of the plurality of sub-patches may include determining the size of each of the plurality of sub-patches based on a resource of a memory in which the descriptor of the feature point is to be stored.

According to an embodiment, the determining the number of the plurality of bins may include determining the number of the plurality of bins based on the resource of the memory in which the descriptor of the feature point is to be stored.

According to an embodiment, the generating of the descriptor of the feature point based on the histogram may include determining the number of bits to be allocated to each of the plurality of bins based on the resource of the memory in which the descriptor of the feature point is to be stored.

According to an embodiment, the feature point may be extracted from the input image based on a scale-invariant feature transform (SIFT) algorithm.

According to an embodiment, the calculating of the gradient orientation may include: performing Gaussian blurring on the main patch using a scale value corresponding to the feature point; and calculating the gradient orientation for each of the pixels included in the target sub-patch.

According to an embodiment, the descriptor generation method may further include, for a representative angle (orientation) calculated in advance for the feature point, subtracting a magnitude of the representative angle from each gradient orientation divided based on the plurality of bins.

According to an embodiment, there is provided an electronic device configured to perform a descriptor generation method of generating a descriptor of a feature point extracted from an input image, the electronic device including: a memory configured to store computer-executable instructions; and a processor configured to execute the instructions by accessing the memory, wherein the instructions cause the processor to: determine the size of each of a plurality of sub-patches included in a main patch of a preset size based on the feature point in the input image; calculate a gradient orientation for each of pixels constituting a target sub-patch among the plurality of sub-patches; determine the number of a plurality of bins for dividing the gradient orientation; for the target sub-patch, generate a histogram for the plurality of bins based on the gradient orientation of the pixels constituting the target sub-patch; and generate the descriptor of the feature point based on the histogram.

According to an embodiment, the instructions cause the processor to determine the size of each of the sub-patches based on a resource of the memory in which the descriptor of the feature point is to be stored.

According to an embodiment, the instructions cause the processor to determine the number of the plurality of bins based on the resource of the memory in which the descriptor of the feature point is to be stored.

According to an embodiment, the instructions cause the processor to determine the number of bits to be allocated to each of the plurality of bins based on the resource of the memory in which the descriptor of the feature point is to be stored.

According to an embodiment, the feature point may be extracted from the input image based on a SIFT algorithm.

According to an embodiment, the instructions cause the processor to: perform Gaussian blurring on the main patch using a scale value corresponding to the feature point; and calculate the gradient orientation for each of the pixels included in the target sub-patch.

According to an embodiment, the instructions cause the processor further to: for a representative angle (orientation) calculated in advance for the feature point, subtract a magnitude of the representative angle from each gradient orientation divided based on the plurality of bins.

According to an embodiment, there is provided an electronic device configured to perform a descriptor generation method of generating a descriptor of a feature point extracted from an input image, the electronic device including: a memory configured to store computer-executable instructions; and a processor configured to execute the instructions by accessing the memory, wherein the instructions cause the processor to: determine the size of each of a plurality of sub-patches included in a main patch of a preset size based on the feature point in the input image, based on a resource of the memory; calculate a gradient orientation for each of pixels constituting a target sub-patch among the plurality of sub-patches; determine the number of a plurality of bins for dividing the gradient orientation, based on the resource of the memory; for the target sub-patch, generate a histogram for the plurality of bins based on the gradient orientation of the pixels constituting the target sub-patch; and generate the descriptor corresponding to the feature point based on the histogram, while determining the number of bits to be allocated to each of the plurality of bins based on the resource of the memory.

According to an embodiment, the instructions cause the processor further to: monitor the resource of the memory in which the descriptor is to be stored.

According to an embodiment, the instructions cause the processor further to: compare a descriptor of at least one feature point of the input image to a descriptor of at least one feature point of another image, and match the input image and the other image; and detect an object based on the matching.

According to an embodiment, the electronic device may be included in a vehicle, wherein the vehicle may be an autonomous vehicle or a vehicle supporting an advanced driver-assistance system (ADAS).

According to an embodiment, the feature point may be extracted from the input image based on a SIFT algorithm.

Effects of Invention

According to various embodiments, there is provided an electronic device and method that may adjust memory usage of descriptors of feature points in various ways.

According to various embodiments, there is provided an electronic device and method that may adjust a method of generating a descriptor of a feature point based on memory resources and may thereby effectively manage the memory resources of a real-time application.

BRIEF DESCRIPTION OF DRAWINGS

FIGS. 2A and 2B are diagrams illustrating various examples using feature points.

FIG. 7 is a flowchart illustrating a descriptor generation method of an electronic device according to an embodiment.

FIG. 8 is a flowchart illustrating a descriptor generation method based on a memory resource according to an embodiment.

DETAILED DESCRIPTION

Best Mode for Carrying Out Invention

Figure 1:
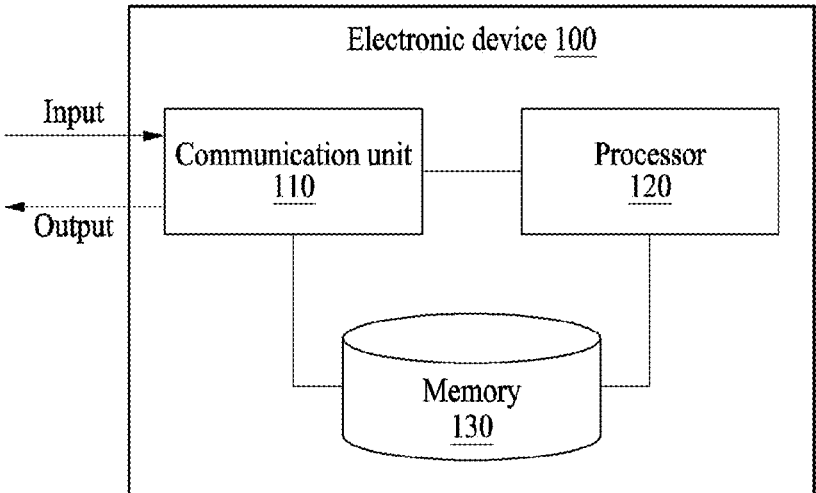
FIG. 1 is a block diagram illustrating an electronic device according to an embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, are used herein to describe components. These terms are used only to distinguish one component from another component. For example, a first component may be referred to as a second component, or similarly, the second component may also be referred to as the first component.

It should be noted that if it is described that one component is "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined herein, all terms used herein including technical or scientific terms have the same meanings as those generally understood by one of ordinary skill in the art to which this disclosure pertains. Terms, such as those defined in generally used dictionaries, are to be construed to have meanings that are consistent with contextual meanings in the related art and are not to be construed as ideal or excessively formal meanings unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

<Electronic Device for Generating Descriptors of Feature Points>

FIG. 1 is a block diagram illustrating an electronic device according to an embodiment.

Referring to FIG. 1, an electronic device 100 configured to generate a descriptor of a feature point extracted from an input image may include a communication unit 110, a processor 120, and a memory 130. The electronic device 100 may be included in a vehicle that is an autonomous vehicle or a vehicle supporting an advanced driver-assistance system (ADAS).

According to an embodiment, the communication unit 110 may be connected to the processor 120 and the memory 130 to transmit and receive data. The communication unit 110 may be connected to another external device to receive data, for example, images captured by a camera. The expression transmitting and receiving "A" may be construed herein as transmitting and receiving information or data indicating "A."

According to an embodiment, the communication unit 110 may be implemented as circuitry in the electronic device 100. For example, the communication unit 110 may include an internal bus and an external bus. For another example, the communication unit 110 may be an element that connects the electronic device 100 and an external device. The communication unit 110 may be an interface. The communication unit 110 may receive data from an external device and transmit the data to the processor 120 and the memory 130.

According to an embodiment, the processor 120 may process the data received by the communication unit 110 and data stored in the memory 130. The "processor" used herein may be a hardware-implemented data processing device having a physically structured circuit to execute desired operations. The desired operations may include, for example, code included in a program or computer-executable instructions. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

According to an embodiment, the processor 120 may execute computer-readable code (e.g., software) stored in a memory (e.g., the memory 130) and instructions triggered by the processor 120.

According to an embodiment, the memory 130 may store data received by the communication unit 110 and data processed by the processor 120. For example, the memory 130 may store a program (or an application or software). The stored program may be a set of syntaxes that are coded to generate a descriptor of a feature point extracted from an input image and executed by the processor 120.

According to an embodiment, the memory 130 may include, for example, at least one volatile memory, non-volatile memory, random-access memory (RAM), flash memory, hard disk drive, and optical disc drive.

According to an embodiment, the memory 130 may store an instruction set (e.g., software) that operates the electronic device 100. The instruction set for operating the electronic device 100 may be executed by the processor 120.

According to an embodiment, the processor 120 may generate a descriptor of a feature point and store the descriptor in the memory 130. The processor 120 may compare descriptor information about feature points between images and determine whether the images are matched (i.e., image matching).

A process in which the processor 120 generates a descriptor of a feature point will be described in detail below with reference to FIGS. 2A to 6.

Figure 2A:
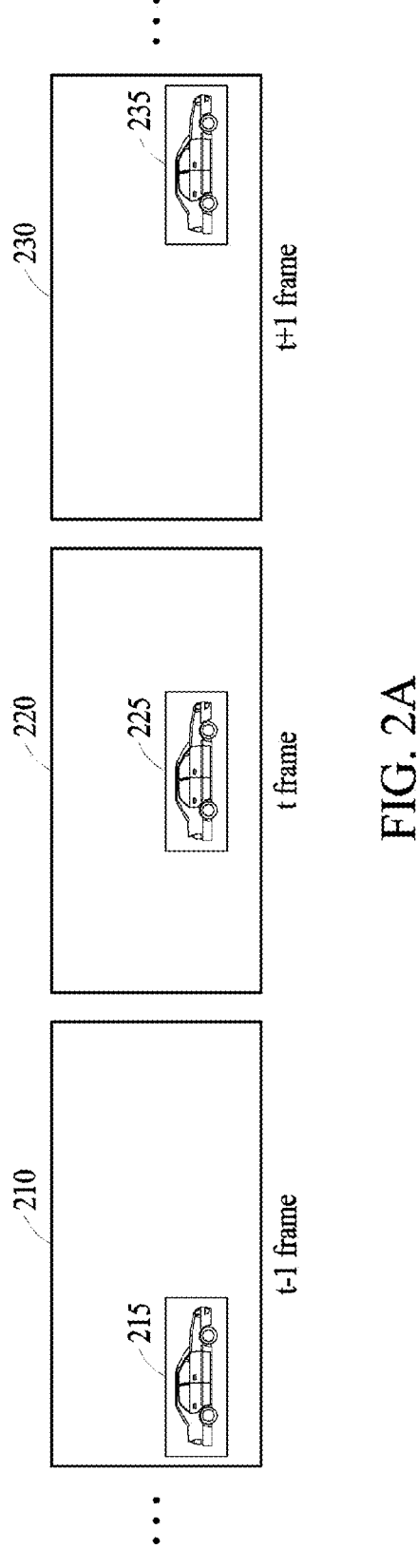

FIGS. 2A and 2B are diagrams illustrating various examples using feature points.

A feature point may be a point that is invariant to the scale (or size), rotation, and brightness of an image, and may be extracted from the same position in the image even if the image rotates or the size or brightness of the image changes. For example, a feature point may be at least one pixel among pixels constituting a background or object in an image.

According to an embodiment, the electronic device 100 may be provided in an autonomous vehicle or a vehicle supporting an ADAS to receive images around the vehicle using at least one sensor and process the images. For example, the electronic device 100 may detect an object present around the vehicle or track the detected object in preparation for a potential problem that may occur during driving.

Referring to FIG. 2A, when the electronic device 100 captures consecutive frames 210, 220, and 230, objects 215, 225, and 235 that are the same object may be included in the consecutive frames 210, 220, and 230. Tracking an object may require detecting the object included in each frame. The processor 120 of the electronic device 100 may detect a feature point in a frame and detect an object based on the detected feature point. According to an embodiment, the processor 120 of the electronic device 100 may perform object tracking by detecting the object 235 in a subsequent frame 230 corresponding to the object 225 detected in a current frame 220.

FIG. 2B shows an example of detecting the same object by comparing feature points of two images 240 and 250. Referring to FIG. 2B, a book in the image 250 is also included in the image 240, and the electronic device 100 may compare a feature point extracted from the image 240 and a feature point extracted from the image 250 to detect the same object. Referring to reference numeral 260, the processor 120 of the electronic device 100 may compare a descriptor of the feature point extracted from the image 240 and a descriptor of the feature point extracted from the image 250 to determine matching between the images 240 and 250. Referring to reference numeral 260 of FIG. 2B, it may be verified that most feature points, except for some feature points, are properly matched.

A representative example method that may extract a feature point from an image and generate a descriptor may be a scale-invariant feature transform (SIFT) algorithm. A typical descriptor generation process based on the SIFT algorithm will be described in detail below with reference to FIGS. 3 and 4.

Figure 3:
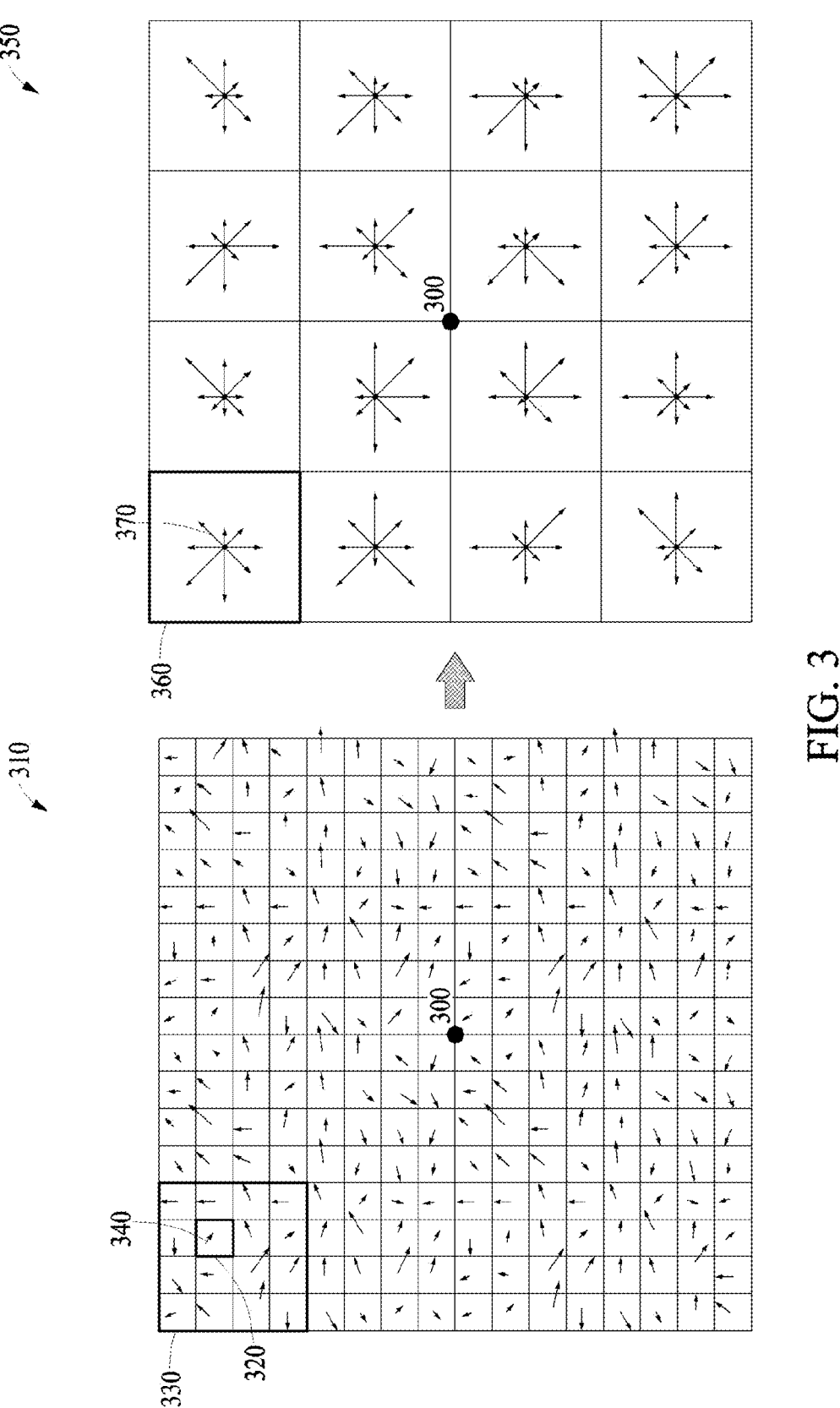
FIG. 3 is a diagram illustrating a typical descriptor generation process based on a scale-invariant feature transform (SIFT) algorithm according to an embodiment.

FIG. 3 is a diagram illustrating a typical descriptor generation process based on a SIFT algorithm according to an embodiment.

Figure 4:
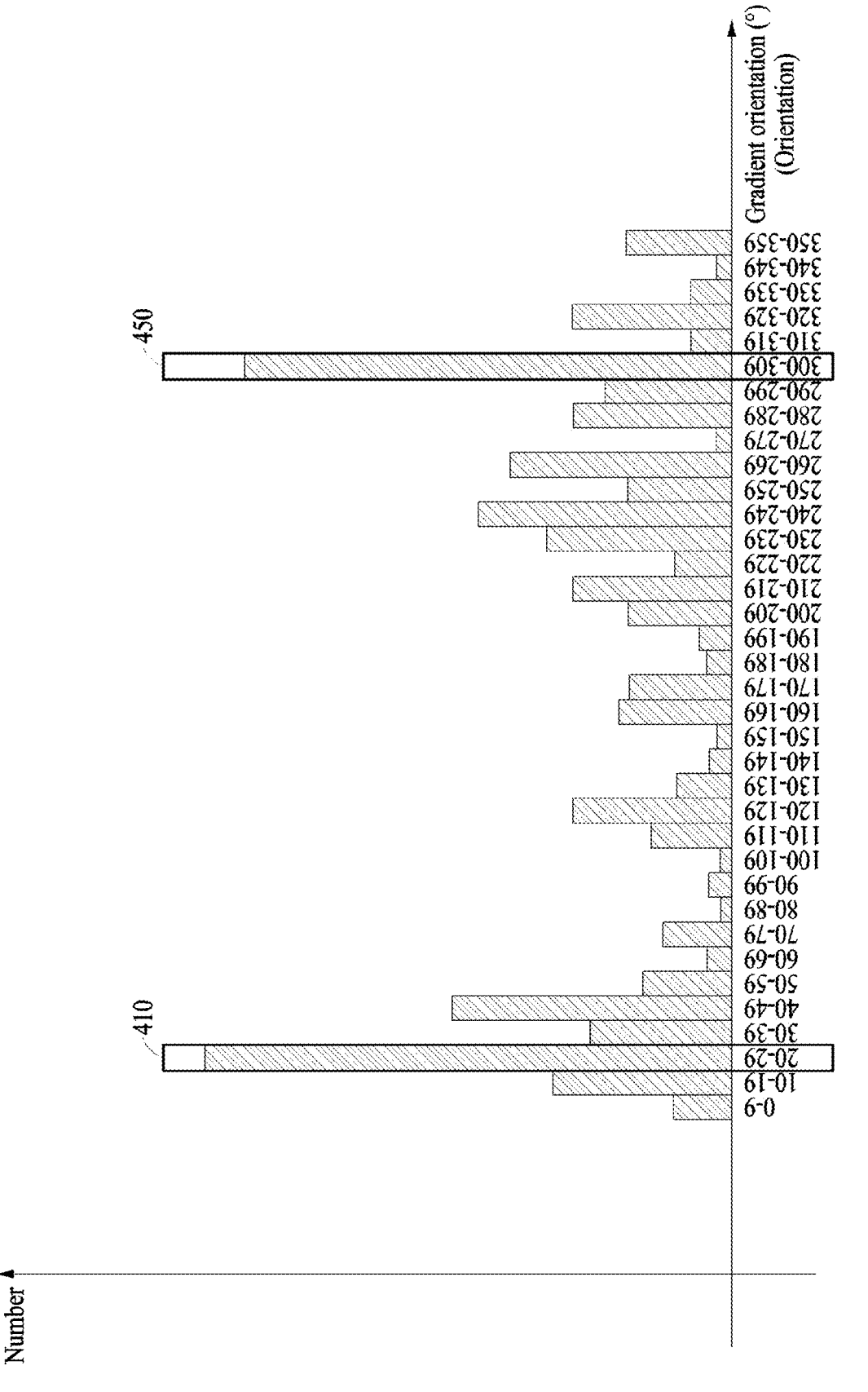
FIG. 4 is a diagram illustrating a histogram for a plurality of bins generated based on a gradient orientation according to an embodiment.

FIG. 4 is a diagram illustrating a histogram for a plurality of bins generated based on a gradient orientation according to an embodiment.

According to an embodiment, a descriptor generation method based on the typical SIFT algorithm will be clearly described below with reference to FIGS. 3 and 4.

FIG. 3 shows a typical process in which a descriptor is generated based on a SIFT algorithm for a feature point extracted from an input image. According to an embodiment, based on the SIFT algorithm, the processor 120 of the electronic device 100 may discover a candidate group of feature points, remove unstable feature points during image matching, calculate a representative angle (or orientation) for each feature point, and generate a descriptor of a feature point. The electronic device 100 may be characterized by a method of generating a descriptor of a feature point, and thus a process of generating a descriptor of a feature point based on the typical SIFT algorithm will be described with reference to FIG. 3, and a detailed description of a process of extracting a feature point and calculating a representative angle will be omitted.

According to an embodiment, the processor 120 may collect images of various scales (or sizes) for an input image based on the SIFT algorithm to generate a scale space, and may perform blurring on the images of the scale space using a Gaussian filter to extract feature points from the images through a difference of Gaussian (DoG) operation. According to an embodiment, the processor 120 may calculate a representative angle for an extracted feature point based on the SIFT algorithm. According to an embodiment, the processor 120 may calculate the size and orientation of a gradient for each pixel and determine a representative angle from a histogram generated based on this.

FIG. 3 shows a typical process of generating a descriptor of a feature point extracted from the SIFT algorithm. According to an embodiment, when using the typical SIFT algorithm, the processor 120 may determine the size of a sub-patch to be a size of 4×4 pixels in a main patch 310 that is based on a feature point 300. That is, the main patch 310 based on the feature point 300 may include 4×4 sub-patches, and each sub-patch (e.g., a target sub-patch 330) may include 4×4 pixels 320.

According to an embodiment, the processor 120 may calculate a gradient orientation for each of pixels (e.g., the pixels 320) included in a plurality of sub-patches (e.g., the target sub-patch 330). For example, the processor 120 may calculate a gradient orientation for a pixel with coordinates (x, y), based on Equation 1 below.

$$\theta(x, y) = \qquad\qquad\qquad\qquad\qquad\text{[Equation 1]}$$
$$a\tan 2(L(x, y+1) - L(x, y-1), L(x+1, y) - L(x-1, y))$$

According to an embodiment, the processor 120 may calculate gradient orientations for all pixels included in the main patch 310 and may calculate a gradient orientation for each of the pixels, as shown in the pixels in the main patch 310 of FIG. 3.

According to an embodiment, the processor 120 may generate a histogram for a gradient orientation based on each sub-patch (e.g., the target sub-patch 330). According to an embodiment, the processor 120 may generate a histogram based on a gradient orientation (e.g., gradient orientations 340 calculated from the pixels 320) that is calculated for each of the pixels (e.g., the pixels 320) included in the target sub-patch 330.

According to an embodiment, the processor 120 may determine the number of a plurality of bins for identifying (or dividing) gradient orientations to generate the histogram, and generate the histogram for the plurality of bins based on the gradient orientation (e.g., the gradient orientations 340 calculated from the pixels 320) calculated for each of the pixels (e.g., the pixels 320). For example, in a case in which the number of bins is eight, dividing (or identifying) 360 degrees (°) into eight bins, such as, for example, 0° to 44°, 45° to 89°, . . . , and 315° to 359°, and gradient orientations of pixels included in a sub-patch may be identified (or divided) based on the plurality of bins.

For example, FIG. 4 shows a histogram generated in a case in which the number of bins is 36 according to an embodiment. According to an embodiment, when determining the number of bins as 36, the processor 120 may generate a histogram in which 360° is divided into 36 bins and gradient orientations of pixels are included in corresponding bins. For example, when a gradient orientation of a pixel is 25°, it may correspond to bin 410 of the histogram shown in FIG. 4. According to an embodiment, a distribution of gradient orientations (e.g., 370 of FIG. 3) may be expressed based on a histogram, and a larger number of bins (e.g., bins 410 and 450 of FIG. 4) may be expressed as longer arrows.

According to an embodiment, a distribution of gradient orientations may be expressed for each sub-patch based on a histogram. For example, in the main patch 310, a histogram may be generated for each sub-patch (e.g., a target sub-patch 360), as shown in a main patch 350, and a distribution of gradient orientations (e.g., 370 of FIG. 3) may be expressed based on the histogram for each sub-patch. For example, reference numeral 370 of FIG. 3 shows a division of gradient orientations of pixels in the sub-patch 360 based on eight bins. The number of pixels included in the eight bins, for example, 0° to 44°, 45° to 89°, . . . , and 315° to 359°, may be expressed as arrows in orientations of 0°, 45°, . . . , and 315°, respectively.

According to an embodiment, the processor 120 may generate a descriptor of the feature point 300 based on the histogram. According to an embodiment, the processor 120 may generate the descriptor of the feature point 300 based on the distribution of gradient orientations of pixels. For example, referring to FIG. 3, there may be the number of histograms (or the distribution 370 of gradient orientations expressed based on the histogram) corresponding to the number of sub-patches (e.g., the target sub-patch 360) for the feature point 300, and the processor 120 may generate the descriptor based on the eight bins for each of 4×4 sub-patches according to the typical SIFT algorithm. The processor 120 may generate the descriptor of a size (128 byte=the number of sub-patches (4×4)×the number of bins (8)×the number of bits allocated to one bin (8)).

In the case of a real-time application to which image matching is applied in real time, the memory capacity required to store descriptors may become excessively large as images are accumulated. According to an embodiment, the processor 120 of the electronic device 100 may generate a descriptor of a smaller size than in the typical SIFT algorithm, based on a modified SIFT algorithm. For example, the processor 120 may determine the size of a sub-patch, determine the number of bins, and determine the number of bits to be allocated to a bin, thereby adaptively adjusting the size of the descriptor. According to various embodiments, a method by which the processor 120 generates a descriptor based on the modified SIFT algorithm will be described in detail below with reference to FIGS. 5 and 6.

Figure 5:
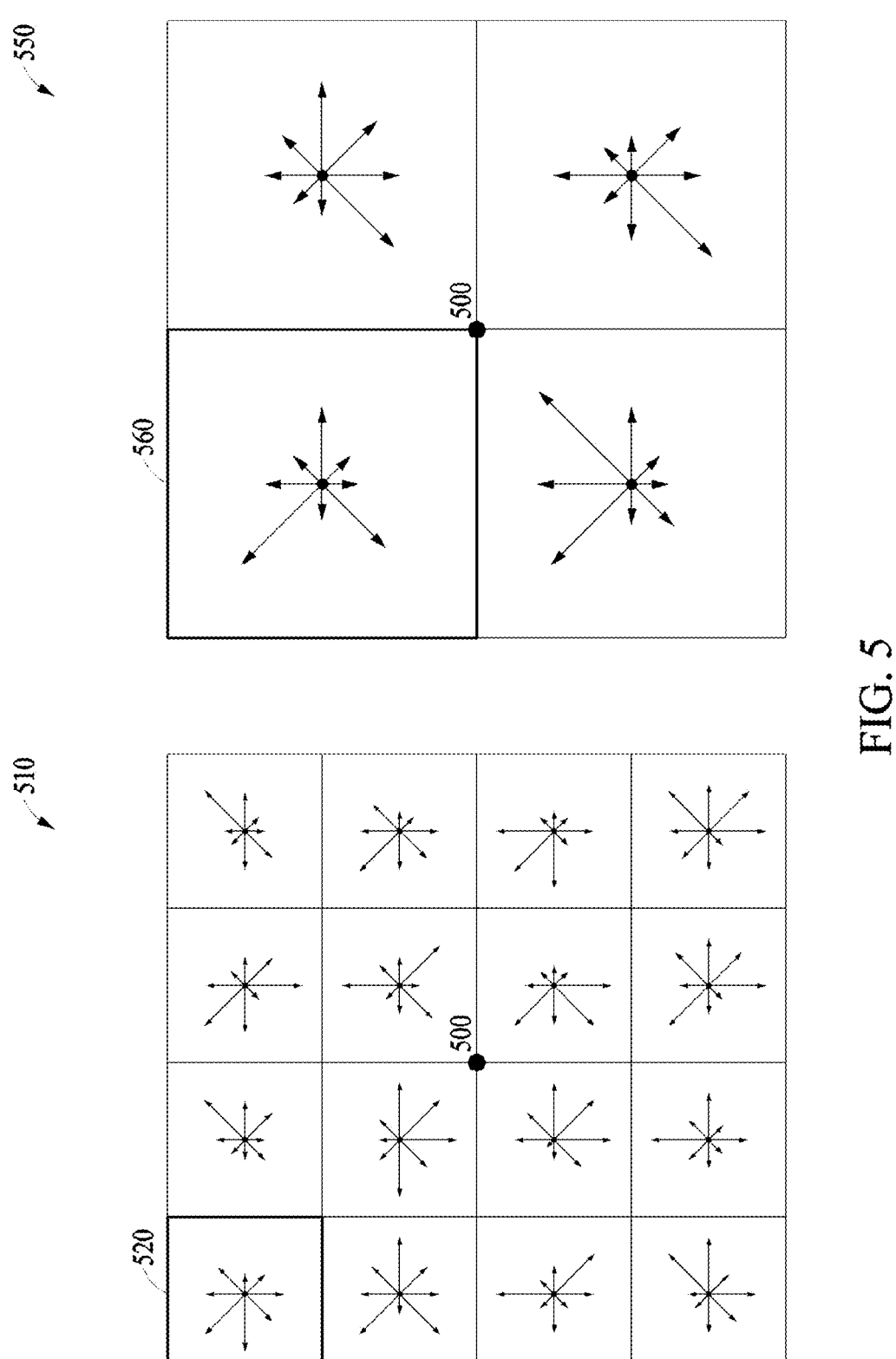
FIG. 5 is a diagram illustrating an operation of generating a descriptor by changing a size of a sub-patch according to an embodiment.

FIG. 5 is a diagram illustrating an operation of generating a descriptor by changing the size of a sub-patch according to an embodiment.

FIG. 5 shows a main patch 510 of a feature point 500 to which a typical SIFT algorithm is applied and a main patch 550 of the feature point 500 to which a modified SIFT algorithm is applied. The respective sizes of the main patches 510 and 550 may be the same as a preset size. According to an embodiment, the processor 120 may change the size of a sub-patch for the main patch 550 to be different from that of the main patch 510.

For example, in the case of a descriptor generation method based on the typical SIFT algorithm, 4×4 sub-patches (e.g., sub-patches 520) may be determined for the main patch 510 of the preset size, but the processor 120 may determine 2×2 sub-patches (e.g., sub-patches 560) for the main patch 550 based on the modified SIFT algorithm. That is, the processor 120 may determine the size of a sub-patch to be 8×8 pixels, rather than 4×4 pixels. According to an embodiment, the processor 120 may determine the size of a sub-patch based on a resource of the memory 130. According to another embodiment, the processor 120 may monitor the resource of the memory 130 and adjust the size of a sub-patch based on the resource of the memory 130 in real time.

According to an embodiment, in a case of dividing the main patch 510 into the 4×4 sub-patches 520 according to the typical SIFT algorithm, a processor may generate a descriptor of a size (128 byte=the number of sub-patches (4×4)×the number of bins (8)×the number of bits allocated to one bin (8)).

According to an embodiment, based on the modified SIFT algorithm, the processor 120 may divide the main patch 550 into the 2×2 sub patches 560, and generate a descriptor of a size (32 byte=the number of sub-patches (2×2)×the number of bins (8)×the number of bits allocated to one bin (8)).

According to an embodiment, in a case of changing the size of a sub-patch as shown in reference numeral 550 of FIG. 5, a capability to express in detail a descriptor may decrease, but the descriptor may be more robust against sensor noise or pixel deterioration. According to an embodiment, when generating a descriptor based on the modified algorithm, the processor 120 may use a smaller memory capacity to store the descriptor.

Figure 6:
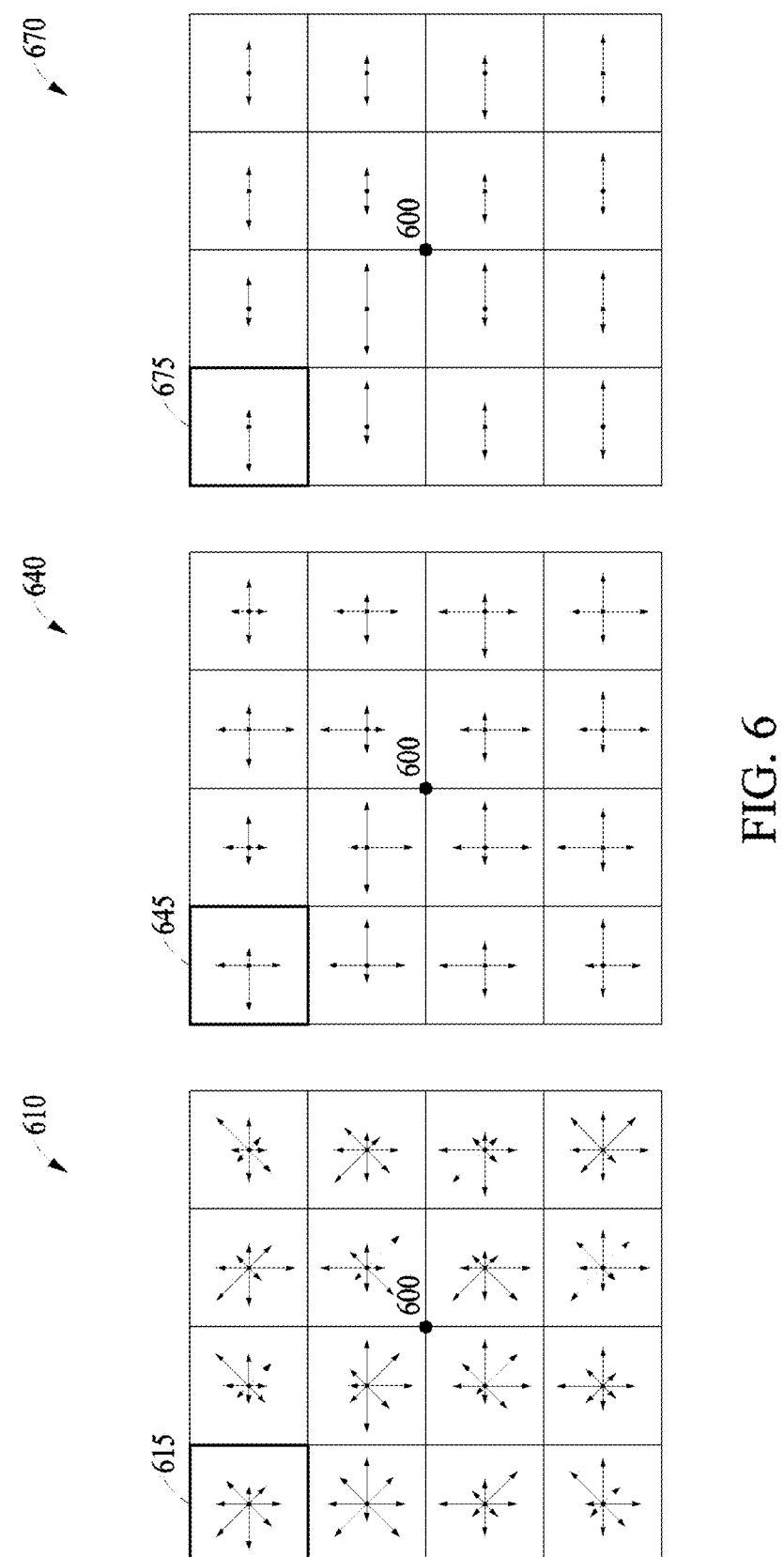
FIG. 6 is a diagram illustrating an operation of generating a descriptor by changing the number of bins for dividing a gradient orientation according to an embodiment.

FIG. 6 is a diagram illustrating an operation of generating a descriptor by changing the number of bins for identifying (or dividing) a gradient orientation according to an embodiment.

FIG. 6 shows a main patch 610 for a feature point 600 to which a typical SIFT algorithm is applied and main patches 640 and 670 for the feature point 600 to which a modified SIFT algorithm is applied. According to an embodiment, the processor 120 may change the number of bins for the main patches 640 and 670 to be different from that for the main patch 610.

For example, in the case of a descriptor generation method based on the typical SIFT algorithm, a gradient orientation may be divided into eight bins for each sub-patch (e.g., sub-patches 615) of the main patch 610, but the processor 120 based on the modified SIFT algorithm may divide a gradient orientation into four bins for each sub-patch (e.g., sub-patches 645) of the main patch 640. According to another embodiment, the processor 120 based on the modified SIFT algorithm may divide a gradient orientation into two bins for each sub-patch (e.g., sub-patches 675) of the main patch 670.

According to an embodiment, the processor 120 may determine the number of bins based on a resource of the memory 130. According to another embodiment, the processor 120 may monitor the resource of the memory 130 to adjust the number of bins for identifying (or dividing) a gradient orientation according to the memory resource in real time.

According to an embodiment, as described above with reference to FIGS. 3 and 4, a processor based on the typical SIFT algorithm may generate a descriptor of a size (128 byte=the number of sub-patches (4×4)×the number of bins (8)×the number of bits allocated to one bin (8)).

According to an embodiment, the processor 120 based on the modified SIFT algorithm may divide a gradient orientation into four bins in each sub-patch (e.g., the sub-patches 645) of the main patch 640, and generate a descriptor of a size (64 byte=the number of sub-patches (4×4)×the number of bins (4)×the number of bits allocated to one bin (8)).

According to an embodiment, the processor 120 based on the modified SIFT algorithm may divide a gradient orientation into two bins in each sub-patch (e.g., the sub-patches 675) of the main patch 670, and generate a descriptor of a size (32 byte=the number of sub-patches (4×4)×the number of bins (2)×the number of bits allocated to one bin (8)).

According to an embodiment, in the case of changing the number of bins as shown in reference numeral 645 or 675 of FIG. 6, a capability of a descriptor to express a gradient orientation may be reduced, but the size of the sub-patches 645 and 675 may be maintained, and thus a capability to identify (or divide) the main patches 640 and 670 may be maintained. According to examination, using four bins in simultaneous localization and mapping (SLAM) may not degrade matching performance, compared to using eight bins, and there may only be an insignificant degradation in matching performance even using two bins. According to an embodiment, when the processor 120 generates a descriptor based on the modified algorithm, it may use only a smaller memory capacity to store the descriptor.

According to an embodiment, the processor 120 based on the modified SIFT algorithm may reduce memory usage by determining the number of bits allocated to one bin, in addition to the embodiments described above with reference to FIGS. 5 and 6. For example, in the case of the typical SIFT algorithm, 8 bits (=1 byte) may be allocated to one bin, but in the case of the modified SIFT algorithm, the processor 120 may allocate 2 or 4 bits to one bin.

According to an embodiment, when changing only the number of bits allocated to a bin to 2 or 4 bits while maintaining the size of a sub-patch at 4×4 pixels, the processor 120 may generate a descriptor of a size (32 byte=the number of sub-patches (4×4)×the number of bins (8)×the number of bits allocated to one bin (2)) or of a size (64 byte=the number of sub-patches (4×4)×the number of bins (8)×the number of bits allocated to one bin (4)), rather than a descriptor of a previous size (128 byte).

According to an embodiment, when the processor 120 changes the number of bits allocated to each bin based on the modified algorithm, positional and directional identifying capabilities may be maintained, and matching performance may thus be maintained. According to an embodiment, when based on the modified algorithm, the processor 120 may use a smaller memory capacity to store a descriptor. According to an embodiment, the processor 120 may adaptively adjust memory usage when storing a descriptor.

According to an embodiment, the processor 120 may generate a descriptor using various combinations of the preceding methods—the method of determining the size of a sub-patch, the method of determining the number of bins, and the method of determining the number of bits allocated to a bin, according to a memory resource. For example, the processor 120 may determine the size of a sub-patch to be 8×8 pixels to form a main patch of a preset size with 2×2 sub-patches, determine the number of bins to be four, and determine the number of bits to be allocated to each bin to be 4 bits, thereby generating a descriptor of a size (8 byte=the number of sub-patches (2×2)×the number of bins (4)×the number of bits allocated to one bin (4)).

<Method of Generating Descriptors of Feature Points>

FIG. 7 is a flowchart illustrating a descriptor generation method of an electronic device according to an embodiment.

Operations 710 to 750 described below may be performed by the processor 120 of the electronic device 100 described above with reference to FIG. 1, and the related description provided above with reference to FIGS. 1 to 6 will not be repeated for conciseness.

According to an embodiment, in operation 710, the processor 120 may determine the size of each of a plurality of sub-patches included in a main patch of a preset size based on a feature point in an input image.

According to an embodiment, as described above with reference to FIG. 5, the processor 120 may determine the size of a sub-patch for a main patch of an input preset size, thereby reducing the capacity to generate a descriptor of a feature point.

According to an embodiment, in operation 720, the processor 120 may calculate a gradient orientation for each of pixels constituting a target sub-patch among the plurality of sub-patches. According to an embodiment, as described above with reference to the main patch 310 of FIG. 3, the processor 120 may calculate a gradient orientation for each of pixels included in sub-patches constituting a main patch.

According to an embodiment, in operation 730, the processor 120 may determine the number of a plurality of bins for identifying (or dividing) the gradient orientation. As described above with reference to FIG. 6, the processor 120 may determine the number of bins to be eight, two, or four.

According to an embodiment, in operation 740, the processor 120 may generate a histogram for the plurality of bins based on the gradient orientation of the pixels constituting the target sub-patch. According to an embodiment, as described above with reference to FIG. 4, the processor 120 may identify (or divide) 0° to 359° into a plurality of bins and allocate gradient orientations of the pixels of the target sub-patch to the bins.

According to an embodiment, in operation 750, the processor 120 may generate a descriptor of a feature point based on the histogram. According to an embodiment, as described above with reference to FIGS. 3 and 4, the processor 120 may generate the descriptor of the feature point and determine the capacity of the descriptor generated for the feature point. According to an embodiment, in operation 750, the processor 120 may determine the number of bits to be allocated to each bin. According to an embodiment, as described above with reference to FIGS. 5 and 6, the processor 120 may generate the descriptor based on the size of sub-patches for the main patch of the preset size, the number of bins, and the number of bits allocated to each bin, and calculate the capacity. According to an embodiment, the processor 120 may generate the descriptor and store the generated descriptor in the memory 130.

FIG. 8 is a flowchart illustrating a descriptor generation method based on a memory resource according to an embodiment.

Operations 810 to 850 described below may be performed by the processor 120 of the electronic device 100 described above with reference to FIG. 1, and the related description provided above with reference to FIGS. 1 to 7 will not be repeated for conciseness.

According to an embodiment, operations 810 to 850 described below may correspond to operations (e.g., operations 710 to 750 of FIG. 7) described above with reference to FIG. 7, and the repeated description thereof will be omitted.

According to an embodiment, in operation 810, the processor 120 may determine the size of each of a plurality of sub-patches included in a main patch of a preset size based on a feature point in an input image, based on a resource of the memory 130. For example, when the resource of the memory 130 is less than a threshold value, the processor 120 may determine the size of each sub-patch to be greater (e.g., 8×8 pixels) than a reference size (e.g., 4×4 pixels) for the main patch of the preset size. As described above with reference to FIG. 5, the processor 120 may determine the size of each sub-patch to be larger, thereby reducing capacity of a descriptor generated for the feature point.

According to an embodiment, in operation 820, the processor 120 may calculate a gradient orientation for each of pixels constituting a target sub-patch among the plurality of sub-patches. Operation 820 may be the same as operation 720, and thus a more detailed description thereof will be omitted.

According to an embodiment, in operation 830, the processor 120 may determine the number of a plurality of bins for identifying (or dividing) the gradient orientation based on the resource of the memory 130. For example, when the resource of the memory 130 is less than the threshold value, the processor 120 may determine the number (e.g., four based on 90° or two based on 180°) of bins to less than a reference number (e.g., eight based on 45°). As described above with reference to FIG. 6, the processor 120 may determine the number of bins to be less than the reference number, thereby reducing the capacity of the descriptor generated for the feature point.

According to an embodiment, in operation 840, the processor 120 may generate a histogram for the plurality of bins based on the gradient orientation of each of the pixels constituting the target sub-patch, for the target sub-patch. Operation 840 may be the same as operation 740, and thus a more detailed description thereof will be omitted.

According to an embodiment, in operation 850, when generating the descriptor of the feature point based on the histogram, the processor 120 may determine the number of bits to be allocated to each of the plurality of bins based on the resource of the memory 130. For example, when the resource of the memory 130 is less than the threshold value, the processor 120 may determine the number of bits (e.g., 4 bits or 2 bits) allocated to each bin to be less than a reference number of bits (e.g., 8 bits). As described above with reference to FIG. 6, the processor 120 may determine the number of bits allocated to each of the plurality of bins to be less than the reference number of bits, thereby reducing the capacity of the descriptor generated for the feature point.

According to an embodiment, the processor 120 may monitor the resource of the memory 130 in real time and may adaptively adjust the size of each of the plurality of sub-patches, the number of the plurality of bins, and the number of bits allocated to each of the plurality of bins, based on a result of the monitoring.

Figure 9:
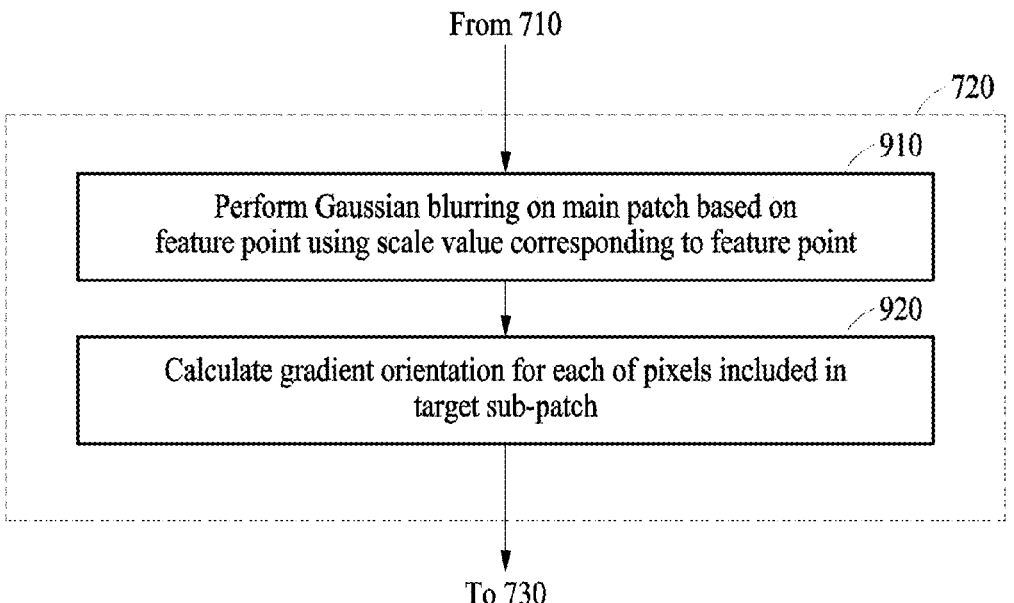
FIG. 9 is a flowchart illustrating an operation of calculating a gradient orientation by an electronic device according to an embodiment.

FIG. 9 is a flowchart illustrating an operation of calculating a gradient orientation by an electronic device according to an embodiment.

Operations 910 and 920 described below may be performed by the processor 120 of the electronic device 100 described above with reference to FIG. 1, and the related description provided above with reference to FIGS. 1 to 8 will not be repeated for conciseness.

According to an embodiment, operations 910 and 920 may correspond to an operation (e.g., operation 720 of FIG. 7) of calculating a gradient orientation for each of pixels constituting a target sub-patch among a plurality of sub-patches, which is described above with reference to FIG. 7. According to an embodiment, operations 910 and 920 may correspond to an operation (e.g., operation 820 of FIG. 8) of calculating a gradient orientation for each of pixels constituting a target sub-patch among a plurality of sub-patches, which is described above with reference to FIG. 8.

According to an embodiment, in operation 910, the processor 120 may perform Gaussian blurring on a main patch of a preset size based on a feature point, using a scale value corresponding to the feature point. According to an embodiment, a scale value (or a scale parameter) corresponding to a feature point may be determined in advance based on a SIFT algorithm. According to an embodiment, the greater the scale value, the greater the level of blurring.

According to an embodiment, in operation 920, the processor 120 may calculate a gradient orientation for each of pixels included in a target sub-patch. According to an embodiment, in operation 920, the processor 120 may also calculate a gradient size for each of the pixels according to the SIFT algorithm and weight the gradient size based on a Gaussian filter. Using the Gaussian filter, the gradient size of pixels close to the feature point may increase, and the gradient size of pixels far from the feature point may decrease.

Figure 10:
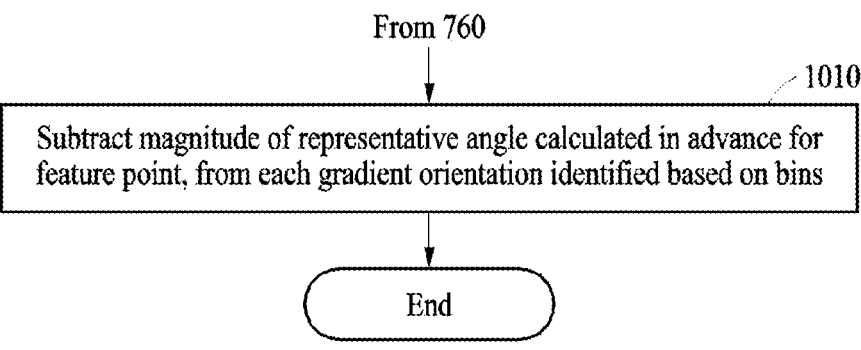
FIG. 10 is a flowchart illustrating a post-processing operation after descriptor generation by an electronic device according to an embodiment.

FIG. 10 is a flowchart illustrating a post-processing operation after descriptor generation by an electronic device according to an embodiment.

Operation 1010 described below may be performed by the processor 120 of the electronic device 100 described above with reference to FIG. 1, and the related description provided above with reference to FIGS. 1 to 9 will not be repeated for conciseness.

According to an embodiment, in operation 1010, the processor 120 may perform post-processing on a generated descriptor. For example, the processor 120 may subtract a magnitude of a representative angle calculated in advance for a feature point, from each gradient orientation divided based on a plurality of bins. The processor 120 may perform operation 1010 such that pixels around the feature point include only direction information relative to the feature point and the feature point becomes invariant to rotation (i.e., rotation invariance).

According to an embodiment, the processor 120 may perform normalization as the post-processing on the descriptor. The normalization may maintain relative brightness and allow the feature point to be invariant to brightness (i.e., brightness invariance).

According to an embodiment, after the post-processing in operation 1010, the processor 120 may compare descriptors of feature points of a plurality of input images and determine whether the images are matched. According to an embodiment, the electronic device 100 may be included in a vehicle that is an autonomous vehicle or a vehicle supporting an ADAS, and the processor 120 may determine image matching in real time for images around the vehicle using a modified SIFT algorithm described above with reference to FIGS. 1 to 9. The processor 120 may generate descriptors based on the modified SIFT algorithm, thereby adaptively controlling memory usage and efficiently managing memory resources.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A descriptor generation method of generating a descriptor of a feature point extracted from an input image, the descriptor generation method comprising:

monitoring resource of a memory in which the descriptor is to be stored;

determining, based on the resource of the memory, the size of each of a plurality of sub-patches comprised in a main patch of a preset size based on the feature point in the input image;

calculating a gradient orientation for each of pixels constituting a target sub-patch among the plurality of sub-patches;

determining, based on the resource of the memory, the number of a plurality of bins for dividing the gradient orientation;

for the target sub-patch, generating a histogram for the plurality of bins based on the gradient orientation of the pixels constituting the target sub-patch; and generating the descriptor of the feature point based on the histogram, wherein number of bits to be allocated to each of the plurality of bins is determined based on the resource of the memory, and when the resource of the memory is less than a threshold value;

the size of each of the plurality of sub-patches is determined to be greater than a reference size, the number of the plurality of bins is determined to be less than a reference number, or the number of bits to be allocated to each of the plurality of bins is determined to be less than a reference number.

2. The descriptor generation method of claim 1, wherein the feature point is extracted from the input image based on a scale-invariant feature transform (SIFT) algorithm.

3. The descriptor generation method of claim 1, wherein the calculating of the gradient orientation comprises:

performing Gaussian blurring on the main patch using a scale value corresponding to the feature point; and calculating the gradient orientation for each of the pixels comprised in the target sub-patch.

4. The descriptor generation method of claim 1, further comprising:

for a representative angle (orientation) calculated in advance for the feature point, subtracting a magnitude of the representative angle from each gradient orientation divided based on the plurality of bins.

5. A non-transitory computer-readable storage medium storing instructions that, when executed by a processor, cause the processor to perform the descriptor generation method of claim 1.

6. An electronic device configured to perform a descriptor generation method of generating a descriptor of a feature point extracted from an input image, the electronic device comprising:

a memory configured to store computer-executable instructions; and a processor configured to execute the instructions by accessing the memory, wherein the instructions cause the processor to:

monitor resource of the memory in which the descriptor is to be stored;

determine, based on the resource of the memory, the size of each of a plurality of sub-patches comprised in a main patch of a preset size based on the feature point in the input image, based on a resource of the memory;

calculate a gradient orientation for each of pixels constituting a target sub-patch among the plurality of sub-patches;

determine, based on the resource of the memory, the number of a plurality of bins for dividing the gradient orientation, based on the resource of the memory;

for the target sub-patch, generate a histogram for the plurality of bins based on the gradient orientation of the pixels constituting the target sub-patch; and generate the descriptor corresponding to the feature point based on the histogram, while determining the number of bits to be allocated to each of the plurality of bins based on the resource of the memory, wherein, when the resource of the memory is less than a threshold value;

the size of each of the plurality of sub-patches is determined to be greater than a reference size, the number of the plurality of bins is determined to be less than a reference number, or the number of bits to be allocated to each of the plurality of bins is determined to be less than a reference number.

7. The electronic device of claim 6, wherein the instructions cause the processor further to:

compare a descriptor of at least one feature point of the input image to a descriptor of at least one feature point of another image, and match the input image and the other image; and detect an object based on the matching.

8. The electronic device of claim 6, being comprised in a vehicle, wherein the vehicle is an autonomous vehicle or a vehicle supporting an advanced driver-assistance system (ADAS).

9. The electronic device of claim 6, wherein the feature point is extracted from the input image based on a scale-invariant feature transform (SIFT) algorithm.

\*   \*   \*   \*   \*